Figures 3A, 3B, 3C, 3D, 3E, 3F, 3G, 3H, 3I, 3J:
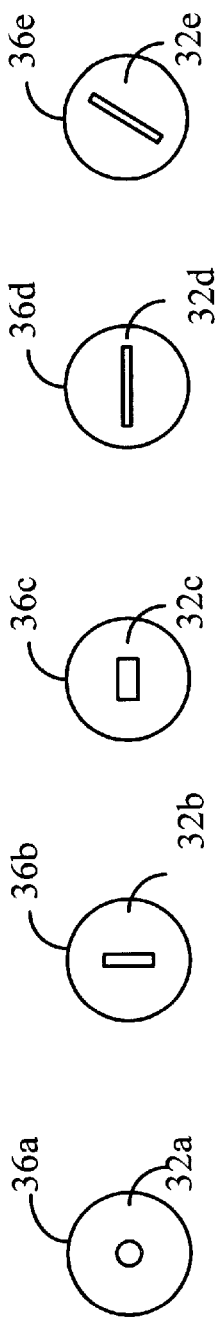
Figure 4:
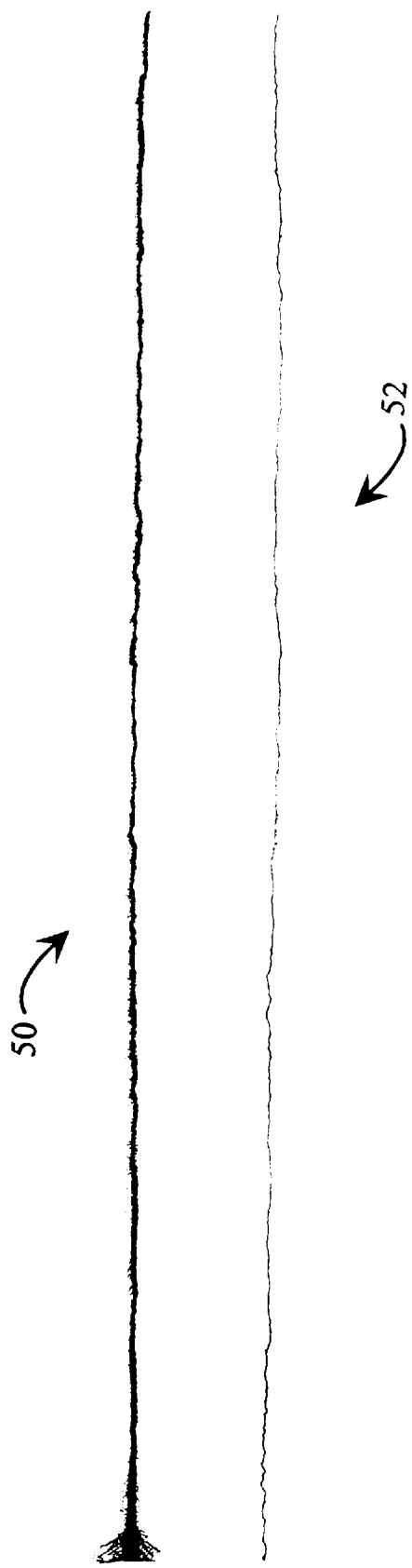

United States Patent
Alosi

[19]

[11] Patent Number: 5,988,527
[45] Date of Patent: Nov. 23, 1999

[54] AIRBRUSH ADAPTER FOR SLOW SPEED FINE LINE DETAIL

[76] Inventor: Victor Francis Alosi, 104 Clinton Rd., East Weymouth, Mass. 02189

[21] Appl. No.: 08/976,251

[22] Filed: Nov. 21, 1997

[51] Int. Cl.[6] .................................................... B05B 15/00
[52] U.S. Cl. .......................... 239/124; 239/390; 239/346
[58] Field of Search ..................................... 239/124, 305, 239/346, 390, 397, 436, 587.1, 602, 518

[56] References Cited

U.S. PATENT DOCUMENTS 4,171,097 10/1979 Rebold ................................ 239/346 X
5,421,518 6/1995 Robisch et al. ......................... 239/311

Primary Examiner—Lesley D. Morris
Attorney, Agent, or Firm—Keith A. Cushing

[57] ABSTRACT

An attachment to an airbrush provides fine line detail with relatively slow movement of the airbrush and attachment. The attachment couples to the nose of an airbrush and receives the atomized media spray from the airbrush within a chamber. The chamber couples to atmosphere through a relatively large bypass orifice and through a relatively small fine line detail nozzle orifice. A majority of the media passes from the bypass orifice, however the media emerging from the attachment fine line detail nozzle orifice and applied to a workpiece to produces fine line detail work without requiring rapid movement of the airbrush relative to the workpiece.

10 Claims, 6 Drawing Sheets

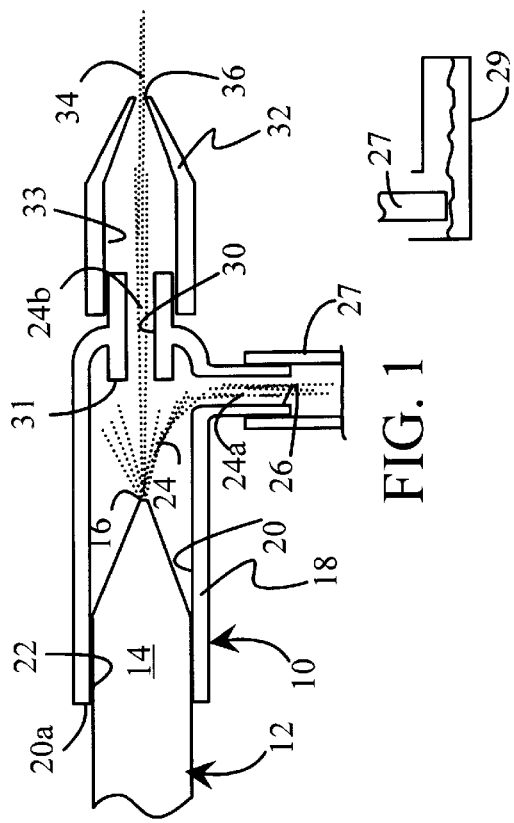
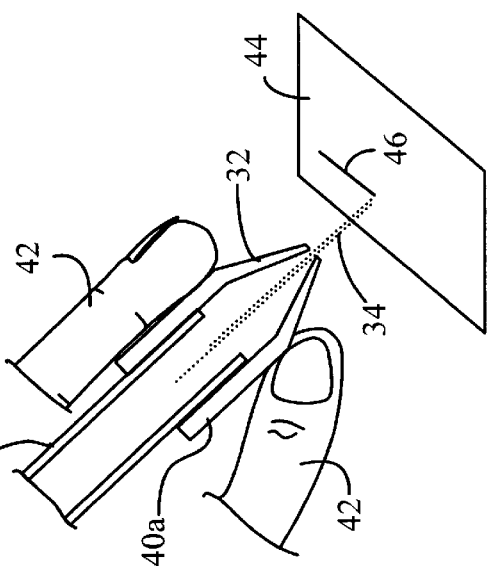
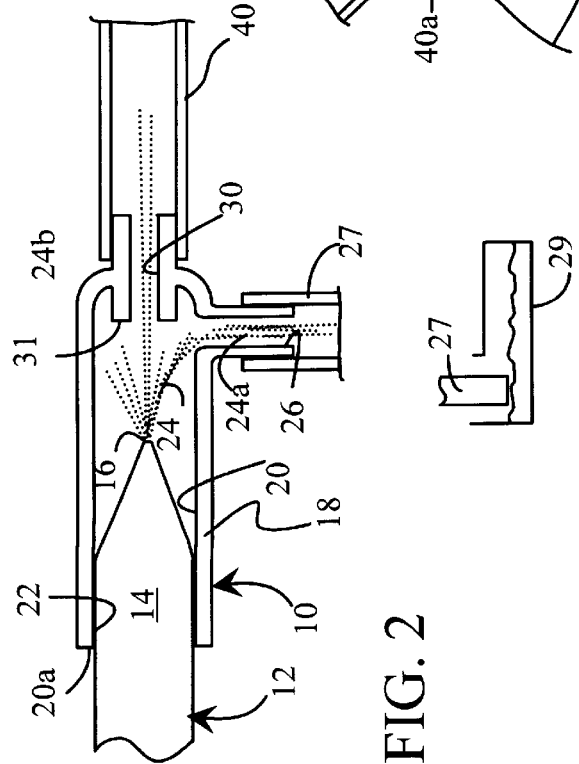
FIG. 1
FIG. 2

AIRBRUSH ADAPTER FOR SLOW SPEED FINE LINE DETAIL

BACKGROUND OF THE INVENTION

An airbrush couples to a pressurized air source and a media source, e.g., a liquid ink or paint media. The media intermixes with an air stream as it exits the airbrush in an atomized spray. Air brushes are versatile and popular tools in many fields. An airbrush may be modified in operation according to a variety of parameters to accomplish a variety of objectives. The amount of air pressure, amount of media introduced into the air stream, and the rate of movement for the airbrush in relation to the workpiece affect the resulting work, i.e., affect how the media appears as it comes to rest on the workpiece.

The atomized media spray follows a conic pattern as it emerges from the airbrush nozzle. This conic pattern naturally carries significant overspray, especially when using relatively high air pressure. Given this conic spray pattern and inherent overspray, the airbrush naturally lacks an ability to focus the media spray. As a result, airbrush work typically includes a given amount of overspray and "fuzzy" rendering. Fine lines and distinct edges typically can only be achieved by use of shielding, e.g., a template held between the airbrush and the workpiece to prevent overspray on the workpiece.

Fine line detail work, therefore, presents a challenge in airbrush design and use. Some airbrushes produce fine line detail. Unfortunately, the artist must move the airbrush quickly to preserve fine line detail as the media strikes the workpiece. If the artist does not move the airbrush quickly, fine line detail is lost in excess media buildup and overspray on the workpiece. Accordingly, only the most skilled airbrush artists can produce any meaningful fine line detail. Even such skilled artists, however, cannot make extensive and practical use of fine line detail due to the need to always move the airbrush rapidly. Because of such limitation, i.e., the requirement that the airbrush move at significant speed relative to the workpiece, fine line detail in airbrush work is generally not possible. Even with a limited ability to render fine line detail work by moving the airbrush at significant speed, conventional airbrushes have not and cannot allow elaborate or intricate fine line detail work.

A relatively expensive type of airbrush, i.e. the "turbine" model reciprocating needle by Paache AB, provides a degree of fine line detail work without requiring that the airbrush move rapidly. The cost, typically six to eight times that of an introductory-level conventional airbrush, makes this airbrush unavailable to most airbrush artists.

Accordingly, there remains need for an affordable airbrush capable of providing fine line detail but at significantly lower speeds. By allowing fine line detail at lower speeds, i.e., speed of the airbrush relative to the workpiece, a greater number of artists can make use of fine line detail in their work and a greater variety of airbrush work becomes possible at even greater detail than previously possible using conventional airbrush designs. The subject matter of the present invention provides a fine line detail rendering ability for a conventional or typical airbrush moving at relatively low speed in relation to the workpiece.

SUMMARY OF THE INVENTION

Figure 5:
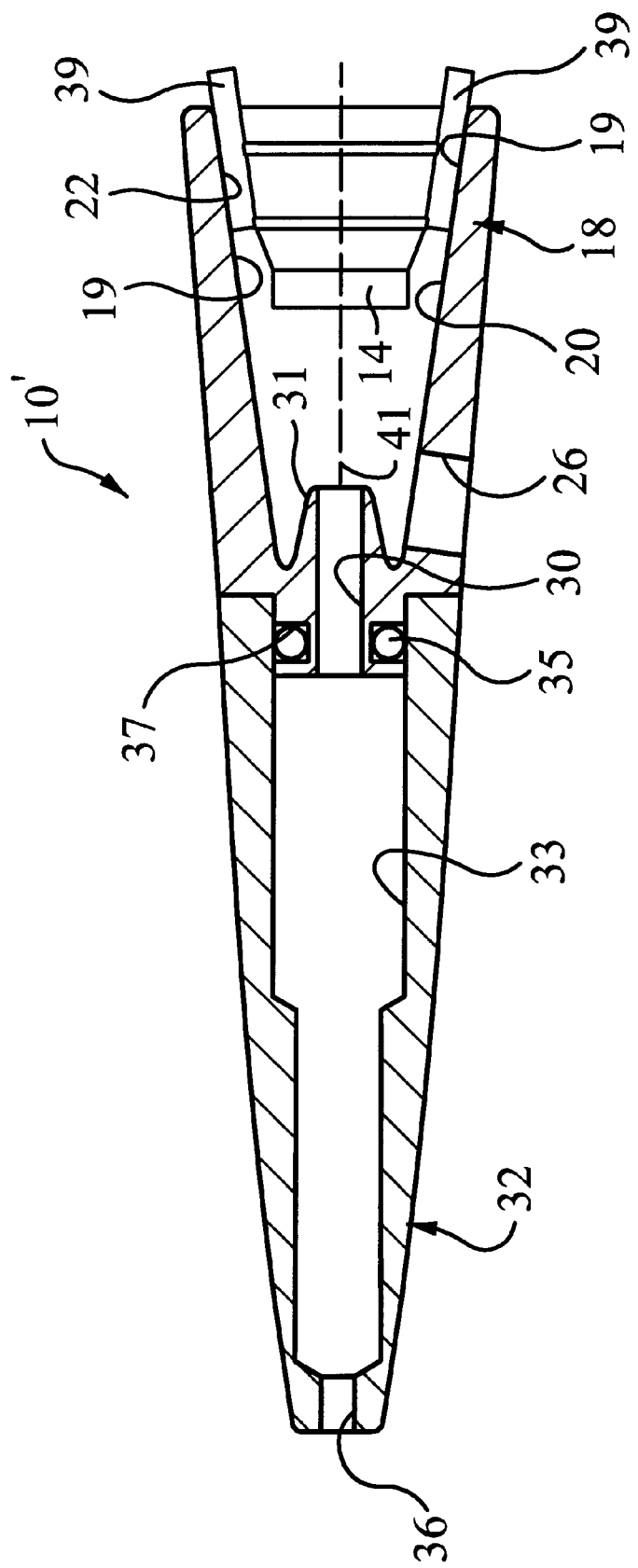
Figure 6A:
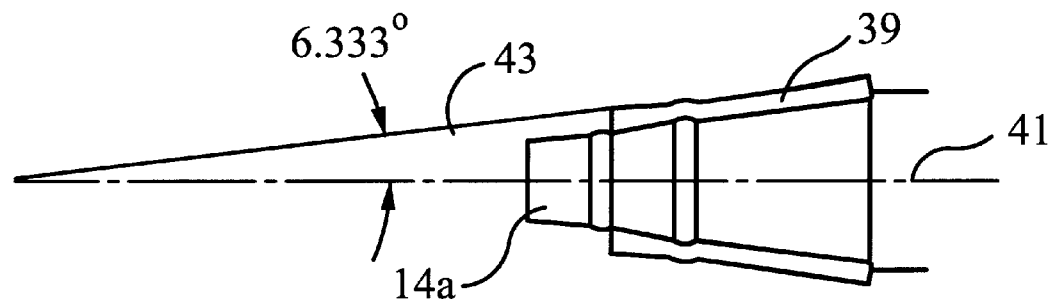
Figure 6B:
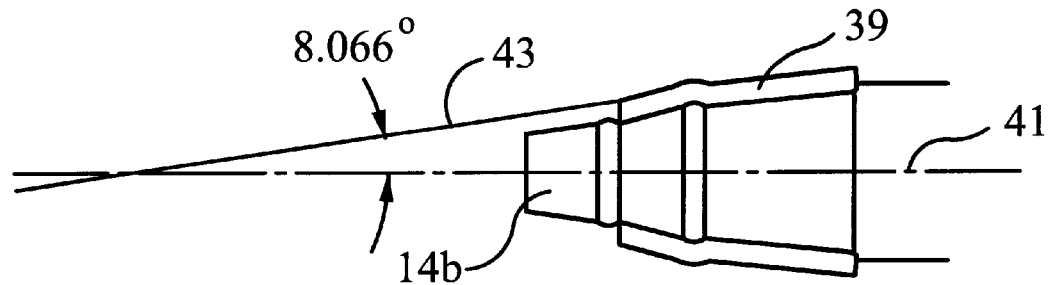
Figure 6C:
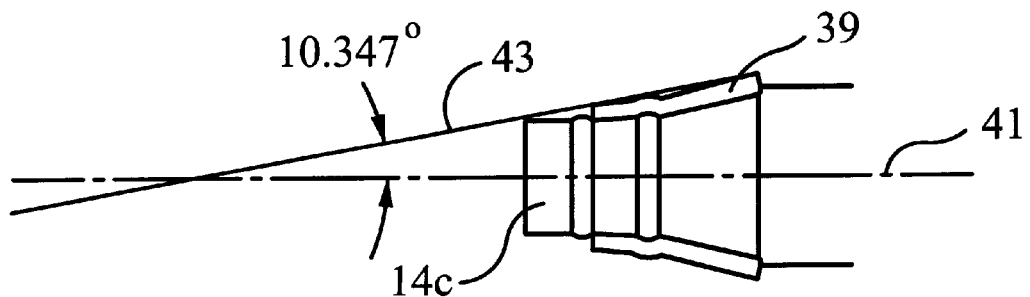

In accordance with the present invention, a conventional airbrush receives an attachment coupling to its spray outlet nozzle. The conventional airbrush output, i.e., atomized media, enters a chamber of the attachment. The flow of atomized media within the chamber is then diverted. The bulk of atomized media passes from the chamber through a bypass outlet. The remaining portion of atomized material, however, passes through an outlet nozzle at the distal end of the chamber as a fine line spray. In essence, the present invention focuses the atomized material more closely along parallel lines as opposed to diverging lines, i.e., as opposed to a conic pattern as found in conventional airbrush design. When applied to a workpiece this focused fine line spray provides fine line detail rendering without requiring rapid movement of the airbrush in relation to the workpiece.

The subject matter of the present invention is particularly pointed out and distinctly claimed in the concluding portion of this specification. However, both the organization and method of operation of the invention, together with further advantages and objects thereof, may best be understood by reference to the following description taken with the accompanying drawings wherein like reference characters refer to like elements.

BRIEF DESCRIPTION OF THE DRAWINGS

For a better understanding of the invention, and to show how the same may be carried into effect, reference will now be made, by way of example, to the accompanying drawings in which:

FIG. 1 illustrates in section in side view partially a conventional airbrush and an adapter attached thereto according to a preferred embodiment of the present invention.

FIG. 2 illustrates partially and in side view a modified form of the airbrush and adapter illustrated in FIG. 1 including a flexible extension hose.

FIGS. 3A–3J illustrate various geometric shapes proposed for use under the present invention.

FIG. 4 illustrates line detail rendered under the present invention as compared to a similar rendering using a conventional airbrush.

FIG. 5 illustrates in section a second embodiment of the present invention.

FIGS. 6A–6C illustrate angular variation in three conventional air brush structures and an elastic tubular gasket used in mounting the air brush attachment of FIG. 5 thereto.

FIG. 7 illustrates dimensions suggested for the air brush attachment of FIG. 5.

DETAILED DESCRIPTION OF THE PREFERRED EMBODIMENT

The preferred embodiment of the present invention is an adapter which couples to a conventional airbrush. The adapter contemplated under the present invention couples to the airbrush through a variety of coupling mechanisms and serves as an attachment for the airbrush when performing fine line detail work. Because fine line detail work is not always desired, the adapter may be removed for conventional use of the airbrush. It will be understood, however, that the adapter described herein could be incorporated into and made integral with an airbrush dedicated to fine line detail work.

FIG. 1 illustrates in section a fine line detail attachment 10 coupled to a conventional airbrush 12 (partially illustrated in FIG. 1). Conventional airbrush 12 includes a nose 14 and outlet nozzle 16. Attachment 10 couples to a variety of airbrush devices, and the specific mounting mechanism for attachment 10 relative to a particular airbrush may vary according to the particular nose 14 structures involved. As illustrated, attachment 10 slides onto and engages nose 14.

Attachment 10 includes a generally tubular body 18 defining a main chamber 20 having an open proximal end 20a. Open end 20a of chamber 20 slides over outlet nozzle 16 and onto nose 14 of airbrush 12. A secure and air-tight seal 22 is thereby established between attachment 10 and nose 14 of airbrush 12. As a result, the atomized media spray 24 emerging from outlet nozzle 16 enters directly into chamber 20 of attachment 10. Attachment 10 diverts some of spray 24 as spray flow 24*a* through a bypass outlet 26. Spray 24*a* exiting chamber 20 by way of bypass outlet 26 may be diverted through a conduit 27 to a bottle or reservoir 29 as shown schematically in FIGS. 1 and 2. Media accumulating in reservoir 29 may then be recycled as desired. The remaining portion of spray 24, i.e., spray flow 24*b*, passes through a conduit 30 at the distal end of chamber 20 and into attachment nozzle 32. As illustrated in FIG. 1, the upstream end of conduit 30, i.e., receiving spray flow 24*b*, extends partially into chamber 20 and forms an annular dam 31. Annular dam 31 improves separation between spray flow 24*a* and spray flow 24*b*. More particularly, annular dam 31 passes spray flow 24*b* as atomized spray traveling through chamber 20. The remaining spray flow 24*b*, especially that portion encountering the inner walls of chamber 20, does not enter conduit 30 and flows eventually out of chamber 20 via bypass outlet 26. In this manner, spray flow 24*b* is an atomized spray entering chamber 33 of nozzle 32. The spray flow 24*b* then emerges from the outlet 36 of nozzle 32 as fine line detail spray 34.

Fine line detail spray 34 applies a highly detailed, high resolution application of media to a given workpiece. Such fine line detail results even when airbrush 12 and attachment 10 move at slow speed relative to the workpiece. Accordingly, the artist produces fine line detail without moving the airbrush at high speed. Allowing fine line detail at low speed, i.e., speed of the airbrush relative to the workpiece, greatly expands the ability of the artist to produce greater detailed work and thereby improves the artist's final work product whenever fine line detail enhances the resulting product. Furthermore, because the present invention provides fine line detail using a relatively inexpensive attachment for a relatively inexpensive airbrush, a broader range of artists have access to fine line detail in their work.

The precise nature of fine line detail spray 34 varies according to several factors. For example, the media used, atomized media spray 24, volume of chamber 20, size of bypass outlet 26, size of nozzle 32 orifice 36, and air pressure applied to airbrush 12.

With respect to air pressure, it is suggested that when using attachment 10 the air pressure applied to airbrush 12 be lowered. Typical air pressure applied to airbrush 12, i.e., in normal use without attachment 10, is 15 to 20 psi.. When using attachment 10, however, air pressure should be turned down to between 5 and 15 psi. for best results.

FIG. 2 illustrates a useful addition to the arrangement of FIG. 1, namely a flexible extension hose 40 coupling nozzle 32 and the down stream end of conduit 30. Hose 40 may be of sufficient length to allow an artist to hold with one hand the distal end 40*a* of hose 40 and nozzle 32 in the fashion of a writing instrument, i.e., a pencil or pen, and render fine line detail as if using a conventional writing instrument. The other hand operates airbrush 12 controls. FIG. 2 illustrates schematically a hand 42 holding hose 40 and nozzle 32 relative to a workpiece 44 and applying spray 34 to produce on workpiece 44 a fine line 46. The configuration of FIG. 2 allows the artist to hold aside airbrush 12 along with the remainder of attachment 10 as attached thereto while holding and manipulating the distal end 40*a* of hose 40 and nozzle 32 as illustrated in FIG. 2.

FIGS. 3A–3J show a variety of shapes which may be used in implementing nozzle orifice 36, individually orifices 36*a*–36*j*. Without discussing each shape in detail, it will be understood that a great variety of shapes, including shapes not specifically shown in FIGS. 3A–3J, may be used in implementation of the present invention. Furthermore, nozzle 32 may be configured for easy removal and mounting relative to attachment 10, or hose 40, to allow rapid interchange between various ones of nozzles 32*a*–32*j* as illustrated in FIGS. 3A–3J. Because spray 34 emerging from nozzle 32 follows more closely straight lines than a conic pattern, nozzle 32 may be held stationary and produce on a workpiece a geometric pattern corresponding to the shape of a particular orifice 36. For example, FIG. 3G illustrates a star-shaped orifice 36*g*. By holding nozzle 32*g* stationary relative to a workpiece and activating airbrush 12, one produces a fine detail star-shaped pattern on the workpiece. By selecting, for example, the slot-shaped orifice 36*e* of nozzle 32*e* shown in FIG. 3*e*, one produces calligraphy-like alphanumeric renditions. Heretofore, producing any stylized writing with an airbrush has generally been virtually impossible. With the attachment of the present invention, however, such airbrush calligraphy becomes possible.

FIG. 4 is a photocopy of an actual rendition using a conventional airbrush and an airbrush equipped with the attachment 10 of the present invention. In FIG. 4, line 50 was produced using a conventional airbrush and line 52 was produced using the same airbrush equipped with an attachment 10. The airbrush used was an Eclipse model airbrush from Iwata operating at 20 pounds per square inch (psi). Line 50 was drawn during a 25 second interval pulling the airbrush in a straight line across the workpiece. Line 52 was drawn during a 35 second interval pulling nozzle 32 across the workpiece in a straight line. Despite the fact that line 52 was drawn at even slower speed than line 50, line 52 presents fine line detail with significantly thinner width and significantly less overspray. As may be appreciated, artists making use of an attachment 10 under the present invention and having an ability to improve fine line detail as represented in the difference between lines 50 and 52 will appreciate that extremely high detail airbrush work can be accomplished at very low speeds.

FIG. 5 illustrates in section a second embodiment of the present invention, an attachment 10' including a body 18' adapted for coupling to the nose 14 of an air brush and including a nozzle 32' emitting a fine line detail spray. Body 18' defines chamber 20' with a generally conic surface 19. Chamber 20' includes a bypass outlet 26' and an annular dam 31' providing access to the inner chamber 33' of nozzle 32'. 0-ring 35 mounts within an annular groove 37 of body 18' and nozzle 32' mounts by friction at o-ring 35 and establishes a gas-tight seal thereat. The distal end of nozzle 32' defines orifice 36'. As may be appreciated, a plurality of different nozzles 32', i.e., each with a distinct shape for orifice 36', may be provided to allow ah air brush artist to quickly switch between selected orifices 36' of distinct geometric shape.

Attachment 10' receives and establishes a gas-tight seal relative to an air brush nose 14 at the conic surface 19. More particularly, and with reference to FIGS. 6A–6C, a flexible silicon tube gasket 39 surrounds nose 14 of a variety of different types of air brushes. In FIGS. 6A–6C, air brush noses 14*a*–14*c* correspond to Iwata air brushes models HP-B, HP-C, and HP-BCS, respectively. As illustrated, each of these air brushes have a different angular geometry, i.e., an angular relationship between a central axis 41 and a line 43 following generally along the corresponding nose 14.

These angular relationships vary between 6.333 degrees and 10.347 degrees as illustrated in FIGS. 6A–6C. With reference to FIG. 5, a corresponding angular relationship between conic surface 19 and central axis 41 is selected to handle this range of air brush configurations, i.e., an 8 degree relationship between central axis 41 and conic surface 19. By placing the tubular silicon gasket 39 over an airbrush nose 14 and inserting this assembly into chamber 20 to engage the conic surface 19, attachment 10' mechanically mounts to an air brush and a gas-tight seal 22' is established. As a result, spray 24 emerging from the air brush is diverted in chamber 20', with a first portion passing annular dam 31' and entering nozzle 32' and a second portion leaving attachment 10' at the bypass orifice 26' as described above.

As with the first embodiment of the present invention, attachment 10' can be fitted with an extension hose to separate nozzle 32' and body 18' if desired.

Figure 7:
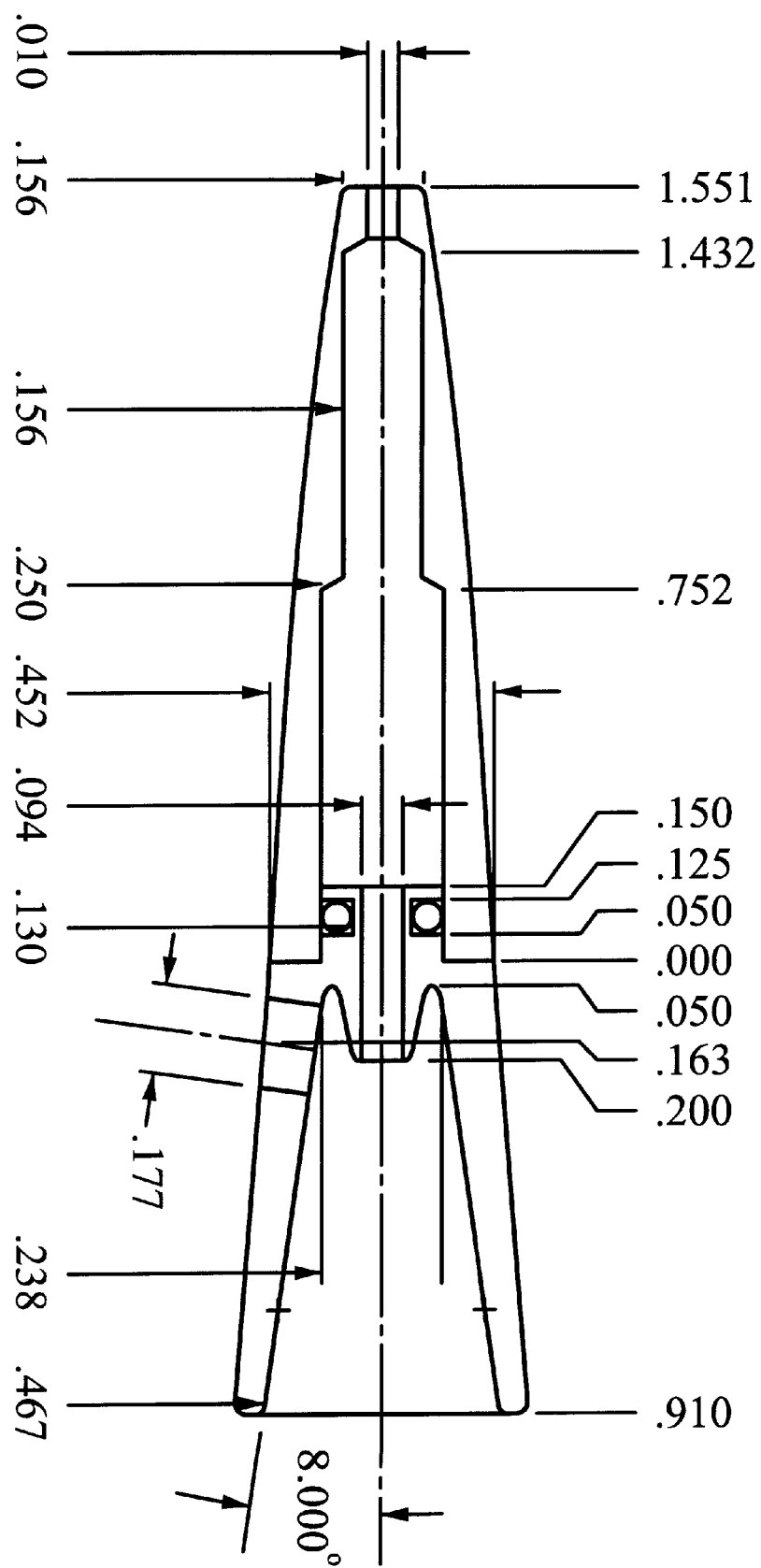

While the present invention may be implemented according to a variety of specific designs including shape and dimension selections, applicant provides as FIG. 7 a specific set of dimensions for a specific embodiment of the present invention. It will be understood, however, that the present invention is by no means limited to such specific dimensions and that the present invention may be implemented and practiced across a variety of geometric configurations and dimensional choices for the various parts and the like. Accordingly, it will be understood that FIG. 7 is provided herewith only as a specific teaching of a preferred form of the present invention at the time of filing the present application.

The dimensional representation in FIG. 7 is at the time of filing the application believed to be a working embodiment of the present invention and provided as a teaching of the best-mode of the invention as of the time of filing. At the time of filing, however, this particular design has not yet been actually constructed and tested.

Thus, an attachment for an airbrush has been shown and described. The attachment converts a conventional airbrush into an apparatus capable of producing high detail fine line work at slow relative speed between nozzle 32 and the workpiece. The attachment focuses the atomized spray into a confined spray pattern and produces very little overspray. As a result, no need for templates or other such shielding apparatus arises as the attachment of the present invention allows direct application of media to the workpiece in fine line detail limited only by the imagination and skill of the artist.

It will be appreciated that the present invention is not restricted to the particular embodiment that has been described and illustrated, and that variations may be made therein without departing from the scope of the invention as found in the appended claims and equivalents thereof.

What is claimed is:

1. A fine line detail adapter for an airbrush including an outlet nozzle, the adapter comprising:

a coupling mechanism adapted for attaching to the airbrush and for receiving in a chamber of said adapter an atomized spray from the airbrush outlet nozzle;

a bypass outlet fluidly communicating with said chamber; and a fine line detail outlet fluidly communicating with said chamber whereby upon the airbrush emitting atomized media into said adapter a first portion of said atomized media emerges from said adapter at said bypass outlet and a second portion at said fine line detail outlet.

2. An adapter according to claim 1 further comprising a conduit coupling said chamber and said fine line detail outlet.

3. An adapter according to claim 2 wherein said conduit comprises a flexible hose of sufficient length to allow an artist to hold a distal end of said flexible conduit together with said fine line detail outlet in the fashion of a writing instrument.

4. An adapter according to claim 1 wherein said fine line detail outlet is formed in a nozzle structure dismountable relative to the remainder of said adapter.

5. An adapter according to claim 4 wherein said adapter further comprises a plurality of said nozzle structures, each having a fine line detail outlet of distinct shape.

6. In combination;

an airbrush including an outlet nozzle and providing atomized media at said outlet nozzle;

an attachment coupling to said airbrush nozzle, said attachment including a chamber receiving said atomized media and including a bypass outlet and a fine line detail outlet.

7. A combination according to claim 6 further comprising a conduit coupling said chamber and said fine line detail outlet.

8. A combination according to claim 7 wherein said conduit comprises a flexible hose of sufficient length to allow an artist to hold a distal end of said flexible conduit together with said fine line detail outlet in the fashion of a writing instrument.

9. A combination according to claim 6 wherein said fine line detail outlet is formed in a nozzle structure dismountable relative to the remainder of said attachment.

10. A combination according to claim 9 wherein said attachment further comprises a plurality of said nozzle structures, each having a fine line detail outlet of distinct shape.

* * * * *